(12) United States Patent
Kirchhoff

(10) Patent No.: US 11,770,662 B2
(45) Date of Patent: Sep. 26, 2023

(54) HEARING AID HOUSING WITH AN INTEGRATED ANTENNA

(71) Applicant: GN HEARING A/S, Ballerup (DK)

(72) Inventor: Laurids Ededal Kirchhoff, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 16/948,911

(22) Filed: Oct. 5, 2020

(65) Prior Publication Data
US 2021/0105566 A1 Apr. 8, 2021

Related U.S. Application Data

(63) Continuation of application No. PCT/EP2019/059330, filed on Apr. 11, 2019.

(30) Foreign Application Priority Data

Apr. 11, 2018 (EP) .................................. 18166792

(51) Int. Cl.
*H04R 25/00* (2006.01)
*H01Q 1/27* (2006.01)
(Continued)

(52) U.S. Cl.
CPC .......... *H04R 25/609* (2019.05); *H01Q 1/273* (2013.01); *H01Q 1/52* (2013.01); *H04B 5/0075* (2013.01); *H04R 25/505* (2013.01); *H04R 25/554* (2013.01); *H04R 25/602* (2013.01); *H04R 25/604* (2013.01); *H04R 25/70* (2013.01); *H04R 2225/021* (2013.01); *H04R 2225/51* (2013.01)

(58) Field of Classification Search
CPC .............. H04R 2225/51; H04R 25/609; H04R 25/505; H04R 25/504; H04R 25/602; H04R 25/604; H04B 5/0075
See application file for complete search history.

(56) References Cited

U.S. PATENT DOCUMENTS

2008/0227235 A1\* 9/2008 Theuss .................. G01L 19/148
                                                          438/53
2011/0194717 A1   8/2011 Hansen et al.
(Continued)

FOREIGN PATENT DOCUMENTS

CN   101835082    9/2010
CN   102026081    4/2011
(Continued)

OTHER PUBLICATIONS

International Search Report and Written Opinion dated Jun. 19, 2019 for PCT/EP2019/059330.
(Continued)

*Primary Examiner* — Sunita Joshi
(74) *Attorney, Agent, or Firm* — Vista IP Law Group, LLP

(57) ABSTRACT

A hearing aid includes: a radio; and a moulded interconnect device (MID) housing; wherein the moulded interconnect device (MID) housing comprises an antenna integrated with the moulded interconnect device (MID) housing such that the antenna is an integral part of the moulded interconnect device (MID) housing; wherein the antenna is operatively connected with the radio for wireless communication.

28 Claims, 6 Drawing Sheets

(51) Int. Cl.
*H01Q 1/52* (2006.01)
*H04B 5/00* (2006.01)

(56) References Cited

U.S. PATENT DOCUMENTS

| | | | |
|---|---|---|---|
| 2012/0110333 A1 | 5/2012 | Lukkarila et al. | |
| 2013/0195294 A1* | 8/2013 | Gebert | H04R 25/604 |
| | | | 381/312 |
| 2013/0343584 A1* | 12/2013 | Bennett | A61J 1/00 |
| | | | 381/317 |
| 2014/0229737 A1 | 8/2014 | Roth et al. | |
| 2017/0064467 A1* | 3/2017 | Fischer | H01Q 1/273 |
| 2018/0007478 A1 | 1/2018 | Nikles et al. | |

FOREIGN PATENT DOCUMENTS

| | | | | |
|---|---|---|---|---|
| CN | 107889554 | | 4/2018 | |
| EP | 1681903 | A2 | 7/2006 | |
| EP | 1681903 | A2 * | 7/2006 | ............ H01Q 1/273 |
| EP | 1763946 | B1 | 11/2008 | |
| EP | 2458675 | A2 | 5/2012 | |
| EP | 2597895 | | 5/2013 | |
| EP | 2597895 | A1 | 5/2013 | |
| EP | 2947803 | A1 | 11/2015 | |
| EP | 3273703 | | 1/2018 | |
| EP | 3273703 | A1 | 1/2018 | |
| WO | 9905895 | A1 | 2/1999 | |
| WO | 03005784 | A2 | 1/2003 | |

OTHER PUBLICATIONS

Foreign Office Action dated Sep. 17, 2020 for EP Appln. No. 15175140.1.
Foreign OA for CN Patent Appln. No. 201980031942.7 dated Jun. 2, 2021.
English translation of the office action for Chinese patent application No. 201980031942.7.
English translation of the Chinese OA dated Jun. 2, 2021 issued for Chinese patent application No. 201980031942.7.
Foreign OA for Chinese patent application No. 201980031942.7 dated Nov. 8, 2021.

* cited by examiner

HEARING AID HOUSING WITH AN INTEGRATED ANTENNA

RELATED APPLICATION DATA

This application is a continuation of International Application No. PCT/EP2019/059330 filed on Apr. 11, 2019, which claims priority to European patent application No. 18166792.4 filed on Apr. 11, 2018. The entire disclosures of the above applications are expressly incorporated by reference herein.

FIELD OF TECHNOLOGY

A new hearing aid is provided that is configured to perform wireless communication with improved performance, fewer parts, simplified assembly, reduced size and cost.

BACKGROUND

A hearing aid with a prior art antenna is disclosed in EP 2 458 675 A2.

SUMMARY

Today's hearing aids need to be capable of performing wireless communication with a variety of other devices and with another hearing aid at the opposite ear. Preferably, the wireless communication is performed in accordance with proprietary and standard wireless communication protocols, such as the Bluetooth, Bluetooth LE, induction loop reception, etc.

The other devices may include another hearing aid mounted at the opposite ear of a user, remote controllers, fitting instruments, mobile phones, media players, TV-streamers, door bells, alarm systems, broadcast systems, e.g. for telecoil replacement, etc., etc.

In order to fulfil this requirement, a hearing aid is provided that may have a number of different antennas that are optimized for different types of communication, such as a dipole antenna for wireless communication at 2.54 GHz in accordance with the Bluetooth LE protocol, and a magnetic induction antenna for wireless communication at, e.g., app. 800 MHz between hearing aids mounted at opposite sides of the head of a user, and a telecoil for induction loop reception.

There is a need for a hearing aid in which the increased complexity caused by the increased requirement for various types of wireless communication is counter-acted with a simplified design that leads to improved performance, fewer parts, simplified assembly, reduced size and cost.

Thus, a hearing aid is provided, comprising
a moulded interconnect device (MID) housing comprising a radio, and wherein
the moulded interconnect device (MID) housing has an antenna, e.g. an RF-antenna; or, a part of an antenna, integrated with the moulded interconnect device (MID) housing, wherein the antenna, or the part of the antenna, is operatively connected with the radio for wireless communication.

The antenna (or part of the antenna) being integrated with the moulded interconnect device (MID) housing is—in the context of the present application—meant such that the antenna (or part thereof) is formed together with the moulded interconnect device (MID) housing as an integral and inseparable part thereof, and such that the antenna does not form an independent part. This means that the antenna (or the part thereof) is not assembled to the moulded interconnect device (MID) housing and may not be dismounted. The antenna (or part thereof) is preferably formed on/in the MID housing by one of the processes described below.

The antenna may of any appropriate type, such as a monopole antenna, a dipole antenna, a slot antenna, a patch antenna, a loop antenna, etc.

The moulded interconnect device (MID) housing may comprise the radio, e.g. the moulded interconnect device (MID) housing may be configured for accommodation of the radio, e.g. the radio may be mounted to the moulded interconnect device (MID) housing and interconnected with other components of the moulded interconnect device (MID) housing via conductors integrated with the moulded interconnect device (MID) housing; or, the moulded interconnect device (MID) housing may comprise a printed circuit board (PCB) with the radio, etc.

In the following, the term "moulded interconnect device (MID)" is abbreviated to "MID", and the term "moulded interconnect device (MID) housing" is abbreviated to "MID housing", and the term "printed circuit board" is abbreviated to "PCB".

A MID is made of plastic, e.g. formed by injection-moulding of a thermoplastic material, and carries one or more integrated conductor paths or traces and electrical connection pads formed by selective metallization.

The MID housing may comprise components, such as various types of antennas, including an RF-antenna, a magnetic induction antenna, a telecoil, an FM antenna, etc., and electronic components, such as the radio, microphone(s), etc. The components may be integrated with or mechanically and electrically connected to the MID housing and can be electrically interconnected with other components through conductor paths integrated with the MID housing.

The mechanical and electrical connection of components to the MID housing may be performed in ways well-known in the art of PCB assembly. Component leads may be inserted in holes surrounded by electrical connection pads integrated with the MID housing. The leads may deform the holes by insertion of the leads into the holes and may thereby establish the desired electrical connections of the leads to the electrical connection pads integrated with the MID housing and also establish mechanical fastening of the components to the MID housing. Alternatively, or additionally, soldering may be used to establish electrical connections and mechanical fastening of the leads to the MID housing. For example, the MID housing may be made of a high temperature plastic material allowing soldering in reflow ovens. Alternatively, or additionally, surface-mount technology (SMT) may be utilized for mechanical and electrical connection of components to the MID housing.

Preferably, the one or more integrated conductor paths or traces of the MID housing are formed utilizing laser direct structuring (LDS); see e.g. WO 1999/005895 A1 and WO 2003/005784 A2.

Placement of components onto the MID housing may be performed using mCAD software. Special design software is available, which can read in mCAD data as well as electrical CAD data including the net list (interconnects). This tool offers interactive routing on the 3D surface as well as an online design rule check.

The LDS process uses a thermoplastic material that is doped with a (non-conductive) metallic inorganic compound activated by means of laser. The plastic is a basic single-component plastic that is injection moulded. The one or more integrated conductor traces are written on the injection moulded plastic with a laser. Where the laser beam hits the plastic the metal additive forms a micro-rough track. The metal particles of this track form the nuclei for the subsequent metallization. In an electroless copper bath, the conductor path layers arise precisely on these tracks. Successively layers of copper, nickel and gold finish can be raised in this way. A wide range of materials is available for the LDS process. The above mentioned antenna (or part thereof) may be formed in this way.

Components of the MID housing may be mounted to the MID housing or integrated with the MID housing or can be located on one or more PCBs that is/are mounted inside the MID housing and possibly electrically interconnected with other components of the MID housing via conductors integrated with the MID housing. The mentioned integrated component and/or integrated conductors may also be integrated using the LDS process and subsequent metallization.

The MID housing may also be manufactured with two-shot moulding, which is an injection moulding process using two different resins and only one of the two resins can be plated. Typically the platable substrate part is ABS and the non-platable substrate part is polycarbonate. The MID housing may be submitted to an electro-less plating process where, e.g., butadiene is used to chemically roughen the surface and allow adhesion of a copper primary layer. The above mentioned antenna (or part thereof) may be formed in this way. Also, the mentioned integrated component and/or integrated conductors may be formed this way.

The radio and the antenna, e.g. RF-antenna, are configured for cooperation for wireless communication with other devices also configured for wireless communication, e.g. utilizing the 2.4 GHz industrial scientific medical (ISM) band e.g. compliant with an international standard for wireless communication, such as the Bluetooth, the Bluetooth LE, etc., standards, e.g. the Bluetooth core specification 4.1 or later or earlier versions.

The radio, when operating in accordance with the Bluetooth LE standard, may be modified to enable reception and transmission of real time audio signals, such as audio data sets, as explained in EP 2 947 803 A1.

An audio data set comprises values of a digital audio signal, such as a sequence of discrete-time and discrete-amplitude digital audio signal values that represent continuous-time and continuous-amplitude values of an analogue audio signal that can be converted into acoustic sound. In other words, an audio data set contains digital data that are intended for conversion into sound at some point in time as is well-known in the art of streaming audio.

A data set transmitted or received by the radio and antenna, including the audio data set, may be a data packet with two kinds of data, namely control information and data. The data is also known as payload or payload data. The control information provides information data that a network needs in order to deliver the data or payload to the intended receiver, for example: source and destination device addresses, error detection codes, and sequencing information. Typically, control information is found in packet headers and trailers, with payload data in between.

The data set may include control data utilized to control the operation of the hearing aid, e.g. the control data may include values of signal processing parameters used for processing an audio signal in the hearing aid including selection of specific signal processing programmes, e.g. for noise suppression.

The MID housing may have a first shield integrated with the MID housing for shielding electronic components of the MID housing from interfering with the antenna and/or shielding the electronic components of the MID housing from electromagnetic interference from the surroundings and/or from causing electromagnetic interference. The first shield may be formed integrated with the MID housing in one of the same ways that the above mentioned antenna is integrated with the MID housing.

The hearing aid may comprise one or more PCBs accommodated in and/or mounted to the MID housing and including the radio, and wherein the antenna is operatively connected with the radio via an electrical connection comprising a conductor of the PCB and a conductor integrated with the MID housing. The latter conductor may be formed integrated with the MID housing in one of the same ways that the above mentioned antenna is integrated with the MID housing.

The electrical connection may be formed by abutment of the conductor of the PCB with the conductor integrated with the MID housing.

A PCB mechanically supports and electrically connects electronic components using conductor paths or traces, electrical connection pads and other features etched from conductive sheets or layers, typically copper sheets, laminated onto a non-conductive substrate. Components, such as capacitors, resistors, active devices, etc., are generally soldered on the PCB.

PCBs can be single sided with one conductive layer, double sided with two conductive layers or multi-layer with outer and inner conductive layers. Conductor paths or traces on different layers are connected with vias, i.e. through-hole paths going through one or more adjacent layers for electrically interconnecting different conductive layers. The vias are typically made conductive by electroplating, or are lined with tubes or rivets. Multi-layer PCBs allow for much higher component density.

Multi-layer PCBs have trace layers inside the board. This is achieved by laminating a stack of materials in a press by applying pressure and heat for a period of time. This results in an inseparable one piece multi-layer PCB. For example, a four-layer PCB can be fabricated by starting from a two-sided copper-clad laminate, etch the circuitry on both sides, then laminate to the top and bottom pre-preg and copper foil. It is then drilled, plated, and etched again to get traces on top and bottom layers.

The hearing aid may comprise a magnetic induction communication unit accommodated in and/or mounted to the MID housing, and a magnetic induction antenna accommodated in and/or mounted to and/or integrated with the MID housing and operatively connected with the magnetic induction communication unit for wireless communication. In embodiments, where the magnetic induction antenna is integrated with the MID housing, the magnetic induction antenna—or parts thereof—may be formed integrated with the MID housing in one of the same ways that the above mentioned antenna is integrated with the MID housing.

The magnetic induction communication unit may be a near-field magnetic induction communication unit connected to the magnetic induction antenna for local, i.e. short range, wireless communication that is not significantly attenuated by human tissue, e.g. between hearing aids worn on opposite sides of a head of a human, or between a unit of the hearing aid worn on the outside of a head of a human and another unit of the hearing aid implanted inside the head of the human.

Preferably, the magnetic induction antenna comprises a coil and a magnetic core, preferably a ferrite core, for provision of a strong magnetic field at low loss and low cost.

The magnetic induction communication unit may be configured for Near-Field Magnetic Induction (NFMI) communication that utilizes a non-propagating magnetic field for communication between devices, whereby a transmitter coil in one device modulates a magnetic field which is received and sensed by a receiver coil in another device.

NFMI communication systems differ from other types of wireless communication systems that use an antenna to generate and transmit an electromagnetic wave radiating outwardly into free space. The power density of the radiated electromagnetic wave decreases with distance to the antenna, namely proportional to the inverse of the distance to the second power ($1/r^2$) or −20 dB per decade, which facilitates long range communication.

NFMI communication systems have a short range (less than 2 meters).

The standard modulation schemes used in typical RF communications (amplitude modulation, phase modulation, and frequency modulation) can be used in NFMI communication systems.

NFMI communication systems are designed to contain transmission energy within the localized magnetic field. The magnetic field energy does not radiate into free space. The power density of nearfield transmissions decreases at a rate proportional to the inverse of the distance to the antenna to the sixth power ($1/r^6$) or −60 dB per decade.

In current commercial implementations of nearfield communications, the most commonly used carrier frequency ranges from 3 Mhz to 15 Mhz, e.g. 13.56 MHz with a wavelength $\lambda$ of 22.1 meters.

The NFMI field is transmitted through human tissue with very little absorption as opposed to RF electromagnetic waves, making NFMI communication systems suitable for communication between devices residing at opposite ears of a human.

The MID housing may have a second shield integrated with the MID housing for shielding, e.g. magnetic shielding, the magnetic induction antenna against electromagnetic radiation emitted by electronic components of the MID housing and/or shielding the electronic components of the MID housing from magnetic fields emitted by the magnetic induction antenna. The second shield may be formed integrated with the MID housing in one of the same ways that the above mentioned antenna is integrated with the MID housing.

One way of increasing the signal to noise ratio of speech from a speaker that a user of the hearing aid, e.g. a hearing aid user, desires to listen to, such as a speaker addressing a number of people in a public place, e.g. in a church, an auditorium, a theatre, a cinema, etc., or through a public address systems, such as in a railway station, an airport, a shopping mall, etc., is to use a telecoil to magnetically pick up audio signals generated, e.g., by telephones, FM systems (with neck loops), and induction loop systems (also called "hearing loops"). In this way, sound may be transmitted to hearing aids with a high signal to noise ratio, e.g. well above the speech reception threshold (SRT) of hearing aid users.

The hearing aid may comprise a telecoil that converts a varying magnetic field at the telecoil into a corresponding varying analogue audio signal in which the instantaneous voltage of the audio signal varies continuously with the varying magnetic field strength at the telecoil.

Telecoils are very sensitive to magnetic fields including magnetic fields generated by other components in a hearing aid, e.g. the output transducer, e.g. a receiver.

The MID housing may have a third shield integrated with the MID housing for shielding electronic components accommodated in the MID housing from interference with the telecoil, e.g. such that the components are prevented from disturbing the telecoil reception and/or the components are shielded from magnetic fields received at the telecoil. The third shield may be formed integrated with the MID housing in one of the same ways that the above mentioned antenna is integrated with the MID housing.

Power may be supplied to the hearing aid by a battery, e.g. located in a battery compartment of the MID housing. The MID housing may have conductive connection terminals, e.g. with electrical connection pads, integrated with the MID housing for electrical interconnection with respective corresponding contacts or terminals of a battery. The electrical connection pads may be formed integrated with the MID housing in one of the same ways that the above mentioned antenna is integrated with the MID housing.

The electrical interconnection between the conductive connection terminals, e.g. with electrical connection pads and the contacts of the battery may comprise abutment of each of the conductive connection terminals with the respective corresponding plus and minus contacts or terminals of the battery.

The MID housing may have resilient members, each of which supports a respective one of the conductive connection terminals and exerts pressure so that the respective conductive connection terminal is pressed against the corresponding battery terminal when the battery is mounted in MID housing.

The hearing aid may comprise one or more microphones, each of which is configured for conversion of an acoustic signal received at the microphone into a corresponding analogue audio signal with an instantaneous voltage that varies continuously with the sound pressure of the acoustic signal at the microphone. Each of the one or more microphones may be mounted to the MID housing and may be connected to another electronic component of the hearing aid through a conductor integrated with the MID housing. Such conductors may be formed integrated with the MID housing in one of the same ways that the above mentioned antenna is integrated with the MID housing.

The hearing aid may comprise an audio processor configured to process the audio signal into a processed audio signal, and an output transducer configured to convert the processed audio signal into an auditory output signal that can be received by the human auditory system and resulting in the user hearing sound.

The audio processor may include a hearing loss processor configured to process the audio signal for compensation of a hearing loss of a user of the hearing aid and wherein the processed audio signal is a hearing loss compensated audio signal based on the audio signal.

The magnetic induction antenna may be mounted to the MID housing so that, when the MID housing is worn at an ear of a user of the hearing aid in its intended position during use, a magnetic field generated by the magnetic induction antenna is directed towards the other ear of the user of the hearing aid.

The near-field magnetic induction communication unit may be configured for provision of an audio signal to the audio processor.

The radio may be configured for provision of an audio signal to the audio processor.

A method of manufacturing a hearing aid is also provided, wherein the method comprises the steps of providing at least a part of a MID housing, and depositing an antenna configured for reception and transmission of electromagnetic waves for wireless communication on the at least part of the MID housing.

The depositing of the antenna may be provided such as described above, either by using the LDS process and subsequent metallization, or by using the above mentioned process of two-shot moulding with subsequent metallization.

The hearing aid may be a hearing aid of any type that is configured to be head worn at an ear of a user of the hearing aid, such as a Behind-The-Ear (BTE), a Receiver-In-the-Ear (RIE), an In-The-Ear (ITE), an In-The-Canal (ITC), a Completely-In-the-Canal (CIC), etc., hearing aid.

The hearing aid may be an implantable device, such as a cochlear implant (CI) with an electrode array implanted in the cochlea for electronic stimulation of the cochlear nerve that carries auditory sensory information from the cochlea to the brain.

The hearing aid may be a cochlear implant with a transmitter housing to be attached to the head of a user and accommodating a NFMI transmitter for transmission of the hearing loss compensated audio signal to a receiver accommodated in a receiver housing to be implanted underneath the skin for provision of the hearing loss compensated audio signal to an electrode to be implanted in the cochlea of the user, based on the received hearing loss compensated audio signal, and wherein the magnetic induction antenna is positioned in at least one of the transmitter housing and the receiver housing of the cochlear implant so that, when the transmitter and receiver housings are worn in their intended positions for normal use at the head of the user, a magnetic field generated in the transmitter housing is directed towards the antenna of the receiver housing for optimum, or substantially optimum, reception.

By provision of a MID housing for a hearing aid, the MID housing having integrated antenna and possibly shield(s) and possibly battery contacts and possibly various electrical connection pads and conductor paths and possibly various electronic components, the number of separate parts of the hearing aid is lowered and the number of electrical interconnections that has to be established individually is lowered whereby assembly time and cost of manufacturing of the hearing aid is lowered. As a result, the size of the hearing aid is lowered and its performance is improved.

Further, provision of electrical interconnections of components and PCBs of the MID housing that are established by abutment of respective conductors lowers the number of solderings to be performed when assembling the hearing aid, thereby further lowering assembly time and cost of manufacturing of the hearing aid.

Typically, an analogue audio signal is made suitable for digital signal processing by conversion into a corresponding digital audio signal in an analogue-to-digital converter whereby the amplitude of the analogue audio signal is represented by a binary number. In this way, a discrete-time and discrete-amplitude digital audio signal in the form of a sequence of digital values represents the continuous-time and continuous-amplitude analogue audio signal.

Throughout the present disclosure, the "audio signal" may be used to identify any analogue or digital signal forming part of the signal path from the output of the one or more microphones, telecoil, radio, or near-field magnetic induction communication unit to an input of the audio processor.

Throughout the present disclosure, the "processed audio signal" may be used to identify any analogue or digital signal forming part of the signal path from the output of the audio processor to an input of the output transducer.

The output transducer may be a receiver, an implanted electrode of a cochlear implant, etc., configured to output an auditory output signal based on the processed, e.g. hearing loss compensated, audio signal, wherein the auditory output signal can be received by the human auditory system, whereby the user hears the sound.

The radio may be a circuit comprising both a wireless transmitter and a wireless receiver. The transmitter and receiver may share common circuitry and/or a single die or housing.

Alternatively, the transmitter and receiver may share no circuitry, and the radio may comprise separate dies or housings with the transmitter and the receiver, respectively.

The near-field magnetic induction communication unit may be a circuit comprising both a wireless transmitter and a wireless receiver. The transmitter and receiver may share common circuitry and/or a single die or housing.

Alternatively, the transmitter and receiver may share no circuitry, and the near-field magnetic induction communication unit may comprise separate dies or housings with the transmitter and the receiver, respectively.

The hearing aid may advantageously be incorporated into a binaural hearing aid system, wherein two hearing aids are interconnected, e.g., utilizing their near-field magnetic induction communication units and antennas, for digital exchange of data, such as audio signals, signal processing parameters, control data, such as identification of signal processing programs, etc., etc., and optionally interconnected with other devices, such as a remote control, etc., e.g. utilizing the radio and antenna, e.g. in compliance with Bluetooth LE.

Signal processing in the new hearing aid, e.g. performed by the audio processor, may be performed by dedicated hardware or may be performed in one or more signal processors, or performed in a combination of dedicated hardware and one or more signal processors.

As used herein, the terms "processor", "signal processor", "audio processor", "controller", "system", etc., are intended to refer to CPU-related entities, either hardware, a combination of hardware and software, software, or software in execution. For example, a "processor", "signal processor", "controller", "system", etc., may be, but is not limited to being, a process running on a processor, a processor, an object, an executable file, a thread of execution, and/or a program.

By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry.

Also, a processor (or similar terms) may be any component or any combination of components that is capable of performing signal processing. For examples, the signal processor may be an ASIC processor, a FPGA processor, a general purpose processor, a microprocessor, a circuit component, or an integrated circuit.

Other and further aspects and features will be evident from reading the following detailed description of the embodiments.

BRIEF DESCRIPTION OF THE DRAWINGS

In the following, the new hearing aid is explained in more detail with reference to the drawings, wherein.

DETAILED DESCRIPTION OF THE DRAWINGS

Figure 1:
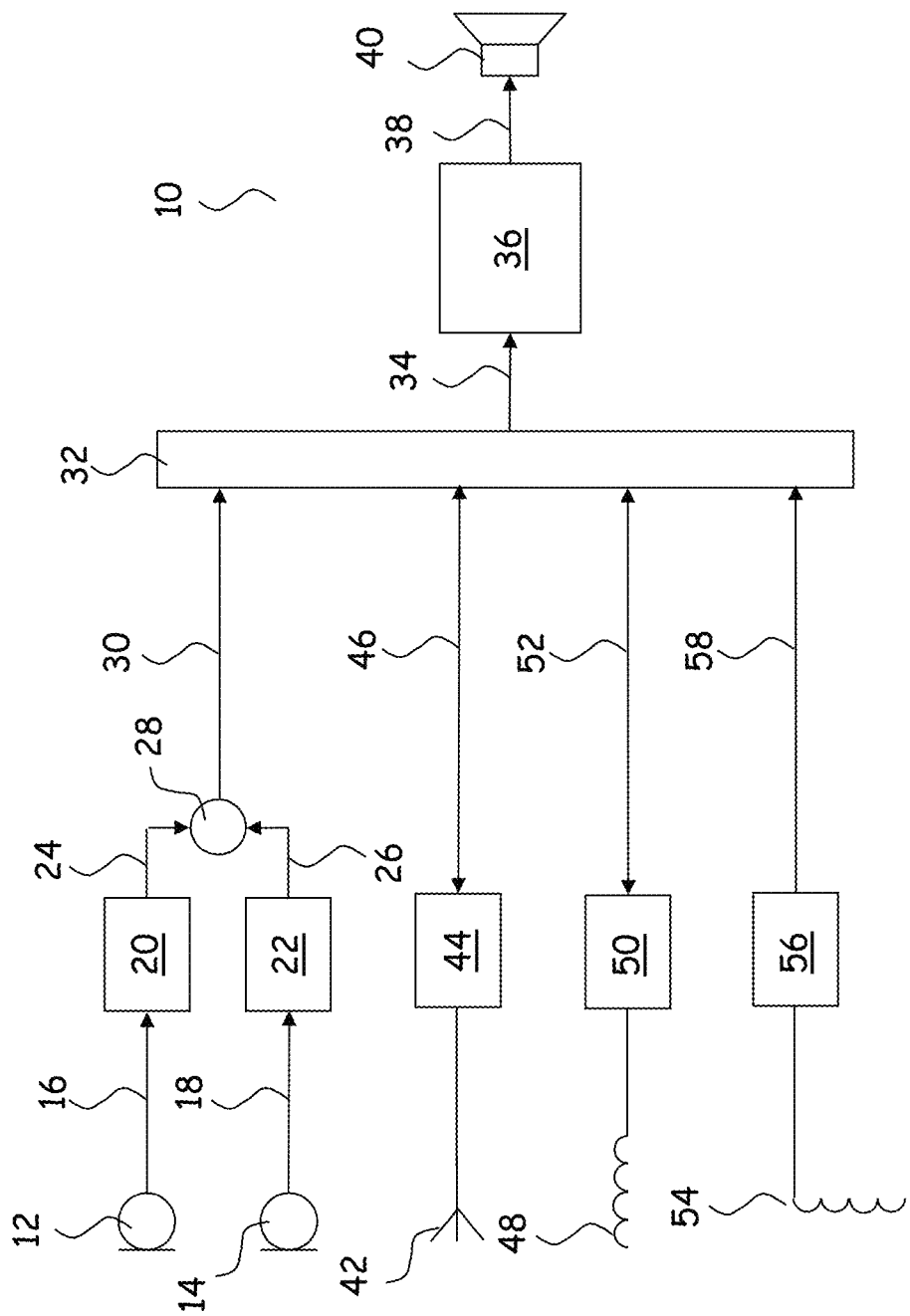
FIG. 1 is a schematic diagram of an exemplary hearing aid circuitry, FIG. 2 schematically illustrates a 2.4 GHz antenna integrated with the MID housing, FIG. 3 schematically illustrates various shields integrated with the MID housing, FIG. 4 schematically illustrates one of the battery contacts integrated with the MID housing, FIG. 5 schematically illustrates one of the integrated PCB contacts of the MID housing for electrical interconnection with a corresponding one of the PCB terminals of the PCB, and FIG. 6 schematically illustrates the position of a magnetic induction antenna in a BTE hearing aid when mounted in its intended operational position behind an ear of a user.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

In the following, various examples of the hearing aid according to the appended set of claims, are illustrated. The hearing aid according to the appended set of claims may, however, be embodied in different forms and should not be construed as limited to the examples set forth herein.

It should be noted that the accompanying drawings are schematic and simplified for clarity, and they merely show details which are essential to the understanding of the inventive concept of the hearing aid according to the appended set of claims, while other details have been left out.

Like reference numerals refer to like elements throughout. Like elements will, thus, not be described in detail with respect to the description of each figure.

FIG. 1 schematically illustrates one exemplary hearing aid circuitry 10 of the new hearing aid. The illustrated new hearing aid is a BTE hearing aid, but the circuitry 10 might as well be used in a hearing aid of any type that is configured to be head worn at an ear of a user of the hearing aid, such as a Behind-The-Ear (BTE), a Receiver-In-the-Ear (RIE), an In-The-Ear (ITE), an In-The-Canal (ITC), a Completely-In-the-Canal (CIC), etc., hearing aid. The circuitry 10 may also be included in an implantable device, such as a cochlear implant (CI) with an electrode array implanted in the cochlea for electronic stimulation of the cochlear nerve that carries auditory sensory information from the cochlea to the brain.

The illustrated hearing aid circuitry 10 comprises a front microphone 12 and a rear microphone 14 for conversion of an acoustic sound signal from the surroundings into corresponding microphone audio signals 16, 18 output by the microphones 12, 14. The microphone audio signals 16, 18 are digitized in respective ND converters 20, 22 for conversion of the respective microphone audio signals 16, 18 into respective digital microphone audio signals 24, 26 that are optionally pre-filtered (pre-filters not shown) and combined in signal combiner 28, for example for formation of a digital microphone audio signal 30 with directionality as is well-known in the art of hearing aids. The digital microphone audio signal 30 is input to the signal router 32 configured to output a weighted sum 34 of audio signals 30, 46, 52, 58 input to the signal router 32. The signal router output 34 is input to an audio processor 36, e.g. including a hearing loss processor configured to generate a hearing loss compensated audio signal 38 based on the signal router output 34. The hearing loss compensated audio signal 38 is input to a receiver 40 for conversion into acoustic sound for transmission towards an eardrum (not shown) of a user of the hearing aid.

The illustrated hearing aid circuitry 10 is further configured to receive data, including control signals and digital audio from various transmitters, such as mobile phones, smartphones, desktop computers, tablets, laptops, radios, media players, companion microphones, broadcasting systems, such as in a public place, e.g. in a church, an auditorium, a theatre, a cinema, etc., public address systems, such as in a railway station, an airport, a shopping mall, etc., etc.

In the illustrated example, data including digital audio is transmitted wirelessly, e.g. at 2.4 GHz, to the hearing aid and received by the hearing aid RF-antenna 42 connected to a radio 44. The radio 44 retrieves the digital data 46 from the antenna signal, including the digital audio, e.g. representing a surround sound signal, a stereo audio signal or a mono audio signal.

The hearing aid circuitry 10 also has a magnetic induction antenna 48 for provision of local, i.e. short range, wireless communication that is not significantly attenuated by human tissue between hearing aids worn on opposite sides of a head of a human. The illustrated magnetic induction antenna 48 comprises a coil and a ferrite core for provision of a strong magnetic field at low loss and low cost. The magnetic induction antenna 48 is mounted to and electrically interconnected with the MID housing 100 shown in the FIGS. 2-5.

The magnetic induction antenna 48 is operatively connected with a near-field magnetic induction communication unit 50 that is configured for demodulation and conversion of the signal received with the magnetic induction antenna 48 into the digital audio signal 52. The near-field magnetic induction communication unit 50 is also configured for modulation of a digital audio signal into a modulated signal suitable for transmission via the magnetic induction antenna 48 that emits a local, non-propagating magnetic field in the direction of the other ear (not shown) of the user of the hearing aid, with field lines aligned with a ferrite core of a magnetic induction antenna in a housing of the other hearing aid at the other ear for optimum, or substantially optimum, reception when both hearing aids are worn in their intended operational positions at the respective ears of the user.

During reception of a surround sound signal, a stereo signal, or a mono signal by the hearing aid RF-antenna 42 connected to the radio 44, the signal router 32 is configured to route the surround sound channel parts, or the stereo channel, or the mono audio signal, intended for the hearing aid (not shown) at the other ear of the user to the near-field magnetic induction communication unit 50 for transmission to the hearing aid worn at the other ear of the user.

The other hearing aid may have the same circuitry 10 as shown in FIG. 1, with a magnetic induction antenna that receives the modulated magnetic field and converts it into a voltage that is output to its near-field magnetic induction communication unit that is configured to demodulate the digital audio of the surround sound signal channel parts, the stereo channel, or the mono audio signal, and forward it to its signal router to include the digital audio in question in the audio signal that is input to its audio processor with its hearing loss processor for hearing loss compensation.

In this way, the digital audio for the other ear, is transmitted to the other hearing aid at the other ear with little attenuation.

The digital audio 46 may include audio from a plurality of sources and thus, the digital audio 46 may form a plurality of input signals for the signal router 32, one input signal for each source of audio.

The hearing aid circuitry 10 also includes a telecoil 54 that converts a varying magnetic field at the telecoil 54 into a corresponding varying analogue audio signal in which the instantaneous voltage of the audio signal varies continuously with the varying magnetic field strength at the telecoil. The varying analogue audio signal is output to the telecoil receiving unit 56 that is configured to demodulate the received signal into digital audio 58 and forward it to the signal router 32 to include the digital audio 58 of the telecoil receiving unit 56 in the audio signal 34 that is input to the audio processor 36 with the hearing loss processor for hearing loss compensation.

In the event of receipt of digital audio by the RF-antenna 42, the magnetic induction antenna 48, or the telecoil 54, the respective digital audio 46, 52, 58 may be transmitted to the user while the other audio signal 30 from the microphones 12, 14 is attenuated during transmission of the respective digital audio 46, 52, 58. The other audio signal 30 may also be muted. The user may enter a command through a user interface of the hearing aid, e.g., of a type well-known in the art, controlling whether the other audio signal 30 is muted, attenuated, or remains unchanged.

Figure 2:
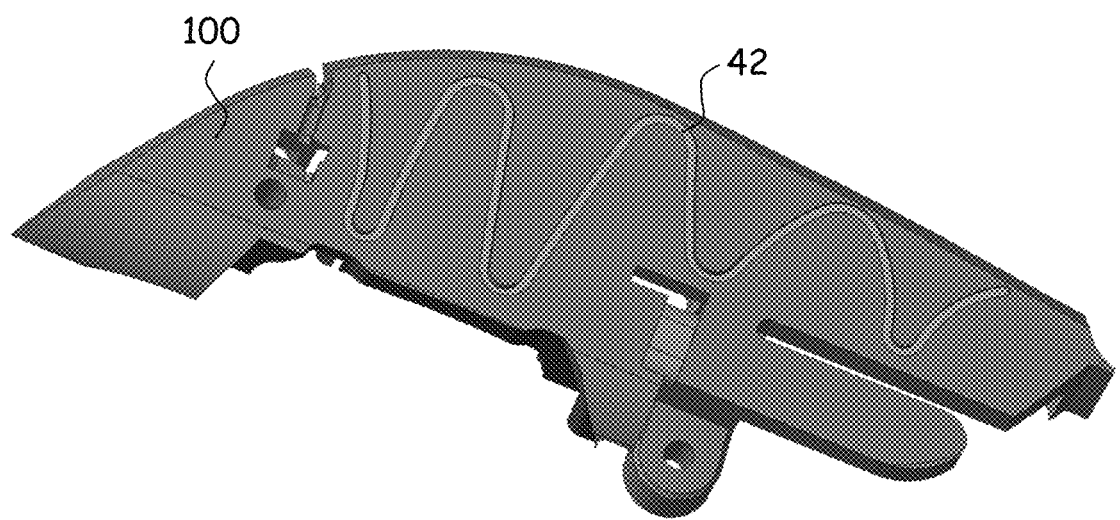

FIG. 2 schematically illustrates from the side, a MID housing 100 for a BTE hearing aid, accommodating the hearing aid circuitry 10 shown in FIG. 1. The MID housing 100 has been made in one piece by single mould injection of a thermoplastic material.

The MID housing 100 may also be made of two parts (not illustrated) that are assembled to form the MID housing 100, e.g. along a joint extending along a periphery of the housing along a longitudinal direction of the housing; or, along a joint extending along a periphery of the housing along a transversal direction of the housing perpendicular to, or substantially perpendicular to, a longitudinal direction of the housing.

An RF-antenna 42 for reception and transmission of electromagnetic waves, e.g. RF-waves, e.g. at frequencies ranging from 1 GHz to 10 GHz, such as 2.4 GHz, is integrated with the MID housing 100. The antenna (or part of the antenna) being integrated with the moulded interconnect device (MID) housing is meant such that the antenna (or part thereof) is formed together with the moulded interconnect device (MID) housing as an integral and inseparable part thereof, and such that the antenna does not form an independent part. This means that the antenna (or the part thereof) is not assembled to the moulded interconnect device (MID) housing and may not be dismounted. The antenna (or part thereof) is preferably formed on/in the MID housing by one of the processes described above, e.g. the integrated RF-antenna 42 is made utilizing Laser Direct Structuring (LDS) of the MID housing 100. The RF-antenna 42 is wound to obtain the length required for resonance at the transmission/reception frequency. In free-field the optimum length of a monopole antenna, or of one half of a dipole antenna, is one quarter of the wavelength of the electromagnetic waves; however, this is modified by the surroundings, such as by head tissue of the user of the hearing aid, by the material of the MID housing 100, etc.

As shown in FIG. 1, RF-antenna 42 is operatively connected with the radio 44 for wireless communication. The radio 44 and the RF-antenna 42 are configured for cooperation for wireless communication with other devices also configured for wireless communication, e.g. utilizing the 2.4 GHz industrial scientific medical (ISM) band e.g. compliant with an international standard for wireless communication, such as the Bluetooth, the Bluetooth LE, etc., standards, e.g. the Bluetooth core specification 4.1 or later or earlier versions.

The radio 44 when operating in accordance with the Bluetooth LE standard may be modified to enable reception and transmission of real time audio data signals as explained in EP 2 947 803 A1.

The hearing aid comprises one or more PCBs (not shown) accommodated in the MID housing 100, one of which includes the radio 44. The RF-antenna 42 is operatively connected with the radio 44 through an electrical connection (not shown) of a conductor (not shown) of the PCB (not shown) with a conductor (not shown) integrated with the MID housing 100 as illustrated in more detail in FIG. 5.

Figure 3:
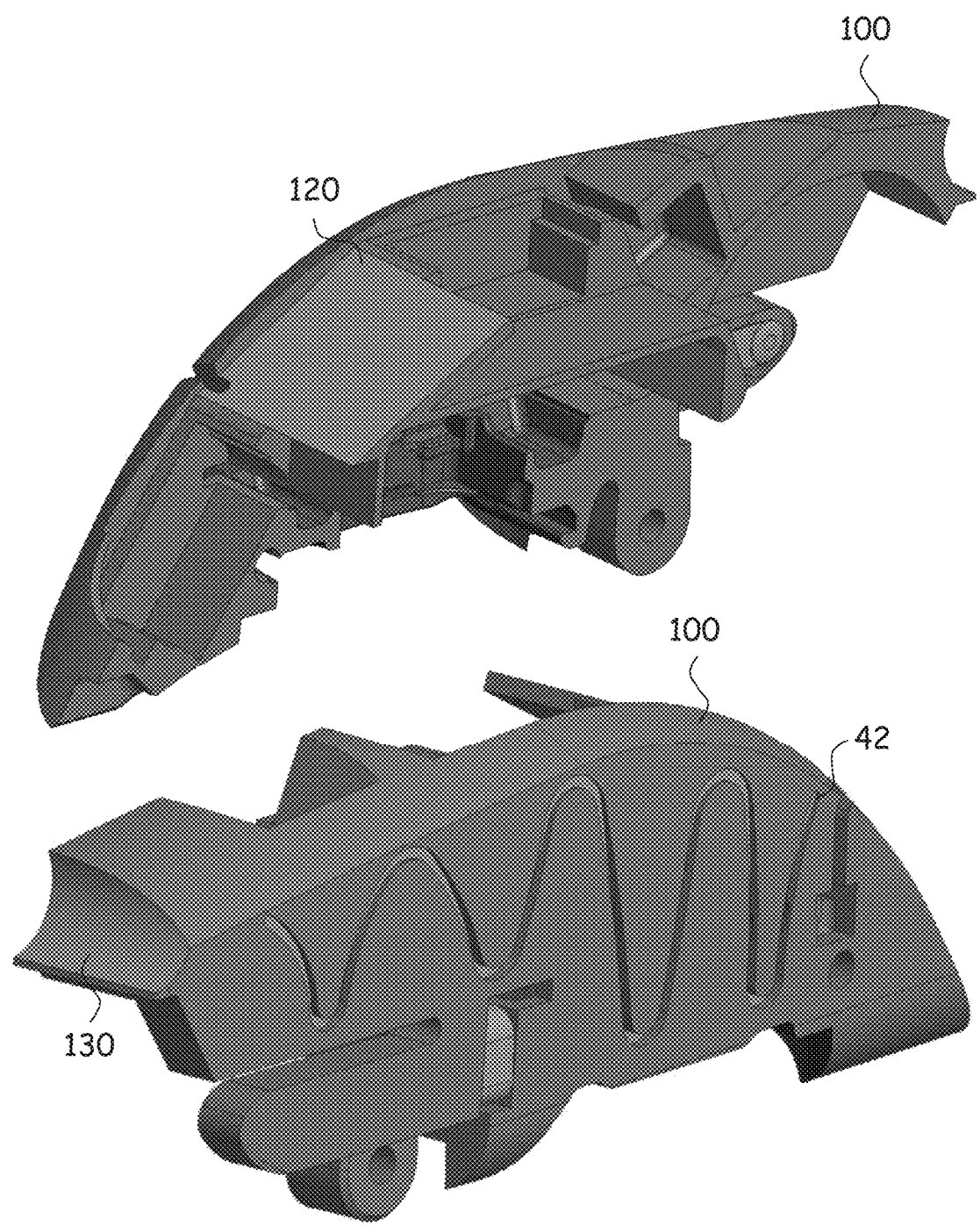

FIG. 3 schematically illustrates the MID housing 100 of FIG. 2. Part of the housing 100 has been cut-away for illustration purposes. The cut-away MID housing is shown in a perspective view from two different viewpoint, allowing a view of an inside of the MID housing (in the top of the figure), and a view of an outer surface of the MID housing (at the bottom of the figure).

The illustrated MID housing 100 has shields 120, 130, 180 integrated with the MID housing 100 for shielding electronic components and antennas of the MID housing 100. The shields being integrated with the moulded interconnect device (MID) housing is—meant such that the shields are formed together with the moulded interconnect device (MID) housing as an integral and inseparable part thereof, and such that the antenna does not form an independent part. This means that the antenna (or the part thereof) is not assembled to the moulded interconnect device (MID) housing and may not be dismounted. The shields is preferably formed on/in the MID housing by one of the processes described above.

The shield 120 is provided between the telecoil (not shown) and electronic components of the MID housing 100 for shielding fields generated by the electronic components from interference with relation to the telecoil (not shown), e.g. such that the components are prevented from disturbing the telecoil reception and/or the components are shielded from magnetic fields received at the telecoil 54.

The shield 130 is provided between the magnetic induction antenna (not shown) and electronic components of the MID housing 100 for shielding, e.g. magnetic shielding, the electronic components from interference with relation to the magnetic induction antenna (not shown), e.g. such that the components are prevented from disturbing the magnetic induction antenna (not shown) and/or the components are shielded from magnetic fields formed by, or received at, the magnetic induction antenna (not shown).

Figure 4:
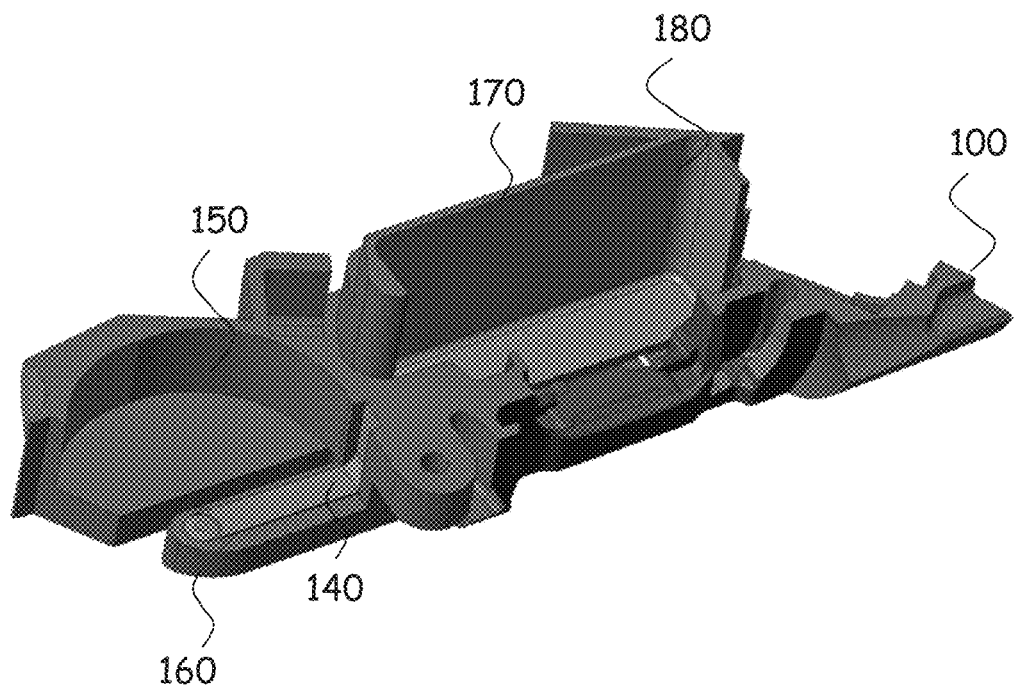

FIG. 4 schematically illustrates the MID housing 100 of FIGS. 2 and 3. Part of the housing 100 has been cut-away for illustration purposes. FIG. 4 shows the inside of a MID housing from a different viewpoint than in the top of FIG. 3

The illustrated MID housing 100 has integrated battery contacts 140 (only one of which is shown) for electrical interconnection with the respective terminals of the battery (not shown) when the battery is mounted in the battery compartment 150. The battery contacts 140 are supported by a resilient part 160 of the MID housing 100 that exerts pressure so that the battery contacts 140 are pressed against the respective battery terminals when the battery is mounted in the battery compartment 150. The battery contacts 140 may be formed on/in the MID housing by one of the processes described above, e.g. the battery contacts 140 may be made utilizing Laser Direct Structuring (LDS) of the MID housing 100.

The illustrated MID housing 100 has a PCB compartment 170 for a PCB (not shown) holding the radio and the audio processor and other parts of the hearing aid circuitry 10 shown in FIG. 1. The PCB (not shown) is electrically connected with the antennas 42, 48 and telecoil 54 and other parts integrated with or mounted to the MID housing 100, through electrical connection pads of the MID housing 100 that abuts corresponding electrical connection pads of the PCB when the PCB is mounted in the PCB compartment 170 so that no soldering is required during mounting of the PCB in the MID housing 100.

The PCB compartment 170 has a shield 180 integrated with the MID housing 100 for shielding the components of the PCB against electromagnetic interference. The shield 180 may be formed on/in the MID housing by one of the processes described above, e.g. the shield 180 may be made utilizing Laser Direct Structuring (LDS) of the MID housing 100.

Figure 5:
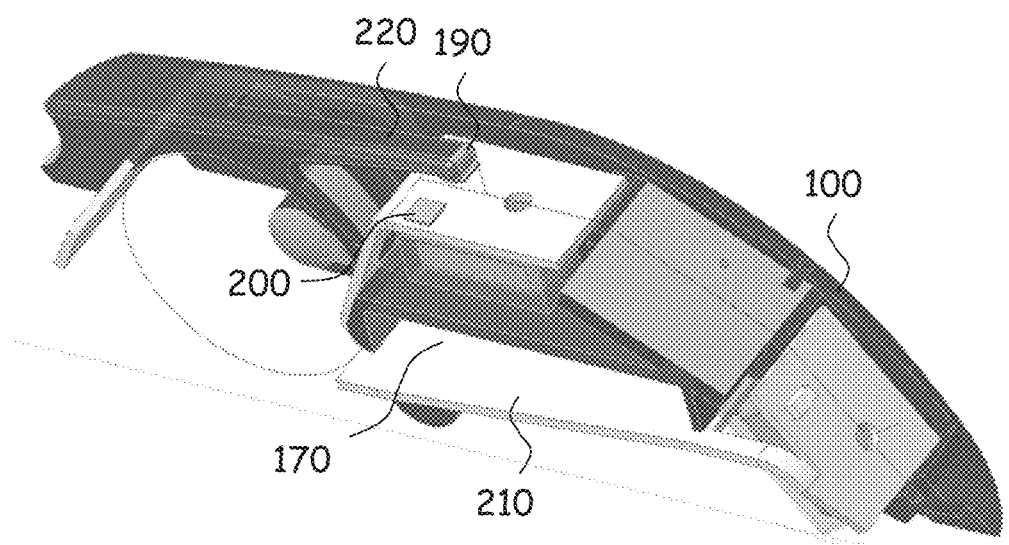

FIG. 5 schematically illustrates the MID housing 100 of FIG. 2. Part of the housing 100 has been cut-away for illustration purposes.

The illustrated MID housing 100 has a PCB compartment 170 for the flexible PCB 210 holding the radio (not visible) and the audio processor (not visible) and other parts of the hearing aid circuitry 10 shown in FIG. 1. The PCB 210 is electrically connected with the antennas 42, 48 and telecoil 54 and other parts integrated with or mounted to the MID housing 100, through PCB contacts 190 (only one of which is shown) integrated with the MID housing 100 for electrical interconnection with respective electrical connection pads 200 of the PCB 210, which is a flexible multi-layered PCB 210. The PCB contacts 190 (only one of which is shown) are supported by a resilient part 220 of the MID housing 100 that exerts pressure so that the PCB contacts 190 are pressed against the respective electrical connection pads 200 of the PCB 210, when the PCB 210 is mounted in the PCB compartment 170 so that no soldering is required when the PCB 210 is mounted in the MID housing 100.

Figure 6:
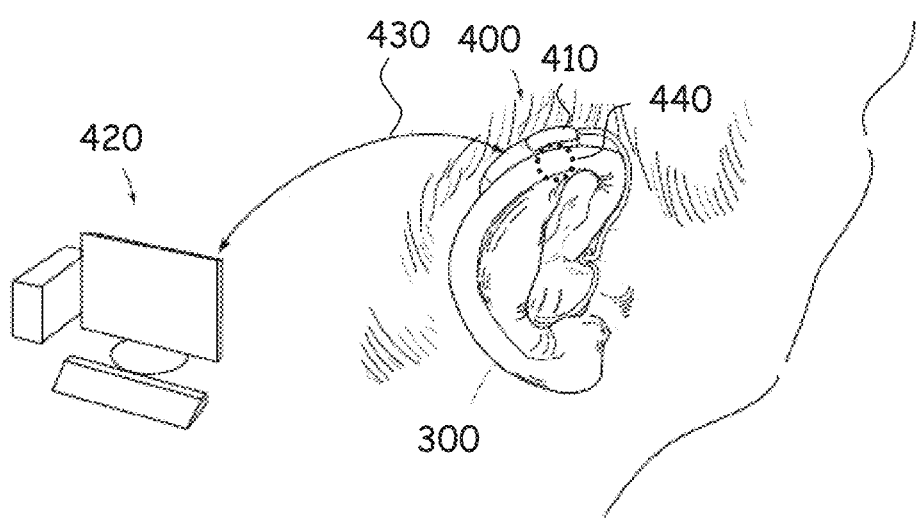

FIG. 6 shows a BTE hearing aid 400 mounted in its intended operating position for normal use, i.e. with its BTE housing 410 mounted behind the ear, i.e. behind the pinna 300, of the user. The BTE housing 410 of the illustrated BTE hearing aid 400 accommodates the hearing aid circuitry 10 shown in FIG. 1.

The illustrated BTE hearing aid 400 forms part of a binaural hearing aid system with a similar second BTE hearing aid (not visible) mounted at the other ear (not visible) of the user.

The second BTE hearing aid (not visible) also comprises the hearing aid circuitry 10 shown in FIG. 1.

FIG. 6 also schematically illustrates a desktop computer 420 that is configured for wireless transmission 430 of data relating to a hardware and/or software configuration of the BTE hearing aid 400, e.g. utilizing the Bluetooth LE protocol, to the BTE hearing aid 400 for adjustment of various parameters of the BTE hearing aid 400.

Further, the desktop computer 420 is configured for wireless streaming of multi-channel audio, e.g. two-channel stereo, multi-channel surround sound, multi-channel teleconference audio, virtual reality 3D sound, etc., to the BTE hearing aid 400.

The desktop computer 420 may comprise a fitting instrument for fitting of the hearing aid 400 to a particular user with a particular hearing loss.

The BTE hearing aid 400 is also configured to receive data, including control signals and digital audio from various other transmitters (not shown), such as mobile phones, smartphones, desktop computers, tablets, laptops, radios, media players, companion microphones, broadcasting systems, such as in a public place, e.g. in a church, an auditorium, a theatre, a cinema, etc., public address systems, such as in a railway station, an airport, a shopping mall, etc., etc.

In FIG. 6, data, including digital audio, that are transmitted wirelessly 430 to the BTE hearing aid 400 are received by the BTE hearing aid RF-antenna 42, see FIG. 1, connected to a radio 44, see FIG. 1. The radio 44, see FIG. 1, retrieves the digital data 46, see FIG. 1, from the received radio signal, including the digital audio, e.g., representing a surround sound audio signal, a stereo audio signal, or a mono audio signal. The signal router 32, see FIG. 1, is also configured to route the surround sound signal channel parts, the stereo channel, or mono audio signal, intended for the second BTE hearing aid mounted at the other ear of the user to the near-field magnetic induction communication unit 50, see FIG. 1, that modulates the digital audio 52, see FIG. 1, of the audio signals in question into a modulated signal suitable for transmission via the magnetic induction antenna 48, see FIG. 1, that emits a local, non-propagating magnetic field in the direction of the second BTE hearing aid (not visible) with field lines aligned with a ferrite core of a magnetic induction antenna in a housing of the second BTE hearing aid for optimum, or substantially optimum, reception when both hearing aids are worn in their intended operational positions at the respective ears of the user during normal operation.

The dotted circle 440 indicates the orientation of the coil having windings around the ferrite core (not visible) of the magnetic induction antenna (not visible). The ferrite core is aligned with the ferrite core of the magnetic induction antenna in the housing of the second BTE hearing aid (not visible) for optimum, or substantially optimum, transmission and reception of the modulated magnetic field.

In the second BTE hearing aid (not visible) with the circuitry 10 shown in FIG. 1, the magnetic induction antenna of the second BTE hearing aid receives the modulated magnetic field and converts it into a voltage that is output to the near-field magnetic induction communication unit that is configured to demodulate the digital audio of the audio signals in question and forward it to the signal router to include the digital audio in the audio signal that is input to the audio processor 36.

In this way, the digital audio of the surround sound signal, the stereo channel, or the mono audio signal, intended for the other ear is transmitted to the second BTE hearing aid at the other ear with little attenuation.

As already mentioned, the digital audio may include audio from a plurality of sources and thus, the digital audio may form a plurality of input signals for the signal router, one input signal for each source of audio.

In the event of receipt of digital audio by the RF-antenna, the digital audio may be transmitted to the user while other audio signals are attenuated during transmission of the digital audio. The other signals may also be muted. The user may enter commands through a user interface of the BTE hearing aid of a type well-known in the art, controlling whether the other signal is muted, attenuated, or remains unchanged.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A hearing aid comprising:
a radio; and
a moulded interconnect device (MID) housing, wherein the MID housing is a hearing aid housing;
wherein the moulded interconnect device (MID) housing comprises an antenna, wherein the antenna is integrally formed on an exterior surface of the moulded interconnect device (MID) housing such that the antenna is an integral part of the moulded interconnect device (MID) housing;
wherein the antenna is operatively connected with the radio for wireless communication.

2. A hearing aid comprising:
a radio; and
a moulded interconnect device (MID) housing, wherein the MID housing is a hearing aid housing;
wherein the moulded interconnect device (MID) housing comprises an antenna integrated with the moulded interconnect device (MID) housing such that the antenna is an integral part of the moulded interconnect device (MID) housing;
wherein the antenna is operatively connected with the radio for wireless communication; and
wherein the hearing aid further comprises a shield integrally formed together with at least a part of the moulded interconnect device (MID) housing.

3. The hearing aid according to claim 1, further comprising a printed circuit board accommodated in the moulded interconnect device (MID) housing, the printed circuit board comprising the radio, and wherein the antenna is operatively connected to the radio via an electrical connection comprising a conductor of the printed circuit board and a conductor that is integral with the moulded interconnect device (MID) housing.

4. The hearing aid according to claim 3, wherein the conductor of the printed circuit board is configured to abut the conductor that is integral with the moulded interconnect device (MID) housing.

5. The hearing aid according to claim 1, further comprising:
a magnetic induction communication unit, and
a magnetic induction antenna operatively connected with the magnetic induction communication unit.

6. The hearing aid according to claim 1, further comprising a telecoil configured to convert a varying magnetic field into a corresponding varying analogue audio signal.

7. A hearing aid comprising:
a radio; and
a moulded interconnect device (MID) housing, wherein the MID housing is a hearing aid housing;
wherein the moulded interconnect device (MID) housing comprises an antenna integrated with the moulded interconnect device (MID) housing such that the antenna is an integral part of the moulded interconnect device (MID) housing;
wherein the antenna is operatively connected with the radio for wireless communication;
wherein the hearing aid further comprises a telecoil configured to convert a varying magnetic field into a corresponding varying analogue audio signal; and
wherein the hearing aid further comprises a shield integral with the moulded interconnect device (MID) housing, the shield configured to at least partly shield electronic components accommodated in the moulded interconnect device (MID) housing from interference with the telecoil.

8. The hearing aid according to claim 6, wherein an instantaneous voltage of an audio signal varies continuously with a varying magnetic field strength at the telecoil.

9. The hearing aid according to claim 1, further comprising conductive battery connection terminals integral with the moulded interconnect device (MID) housing for electrical interconnection with respective corresponding contacts of a battery.

10. The hearing aid according to claim 9, wherein the conductive battery connection terminals comprise electrical connection pads, and wherein the electrical connection pads are configured to abut with respective ones of the contacts of the battery.

11. The hearing aid according to claim 1, further comprising a microphone mounted to the moulded interconnect device (MID) housing, the microphone configured for conversion of an acoustic signal into a corresponding audio signal;
wherein the hearing aid further comprises a conductor integral with the moulded interconnect device (MID) housing, the conductor configured to transmit the audio signal to another electronic component of the hearing aid.

12. The hearing aid according to claim 11, further comprising:
an audio processor configured to process the audio signal into a processed audio signal; and
an output transducer configured to convert the processed audio signal into an auditory output signal that can be received by a human auditory system.

13. The hearing aid according to claim 12, wherein the audio processor comprises a hearing loss processor, and
wherein the processed audio signal is a hearing loss compensated signal generated based on the audio signal and a hearing loss of a user of the hearing aid.

14. The hearing aid according to claim 5, wherein the magnetic induction antenna is mounted to, or integral with, the moulded interconnect device (MID) housing, so that when the moulded interconnect device (MID) housing is worn at an ear of a user of the hearing aid in its intended position during use, a magnetic field generated by the magnetic induction antenna is directed towards the other ear of the user of the hearing aid.

15. The hearing aid according to claim 1, wherein the antenna has an inflection point.

16. The hearing aid according to claim 1, wherein the moulded interconnect device (MID) housing has a wall, and wherein the antenna is disposed on the wall.

17. The hearing aid according to claim 16, wherein the wall on which the antenna is disposed is a part of a behind-the ear (BTE) unit.

18. The hearing aid according to claim 16, wherein the wall of the moulded interconnect device (MID) housing on which the antenna is disposed comprises a vertical wall.

19. The hearing aid according to claim 1, wherein the moulded interconnect device (MID) housing is made from an electroplatable resin.

20. The hearing aid according to claim 1, wherein the moulded interconnect device (MID) housing is made from a thermoplastic material containing laser-activatable compound.

21. A method of manufacturing a hearing aid, comprising:
providing at least a part of a housing; and
forming an antenna on the at least the part of the housing such that the antenna is integral with the at least the part of the housing;
wherein the at least the part of the housing and the antenna together form at least a part of a moulded interconnect device (MID) housing;
wherein the at least the part of the housing comprises an exterior surface of the housing, and the antenna is integrally formed on the exterior surface of the housing.

22. The hearing aid according to claim 1, wherein the moulded interconnect device (MID) housing has a side, and wherein an entirety of the antenna is at the side of the moulded interconnect device (MID) housing.

23. The hearing aid according to claim 1, wherein the moulded interconnect device (MID) housing has a surface part interfacing the antenna, the surface part having an inflection point.

24. The hearing aid according to claim 2, wherein the shield is configured to shield electronic components of the moulded interconnect device (MID) housing.

25. The hearing aid according to claim 2, wherein the antenna comprises a magnetic induction antenna integrated with the moulded interconnect device (MID) housing, and wherein the shield that is integrally formed with the at least a part of the moulded interconnect device (MID) housing is configured to shield the magnetic induction antenna integrated with the moulded interconnect device (MID) housing.

26. The hearing aid according to claim 1, further comprising:
a telecoil configured to convert a varying magnetic field into a corresponding varying analogue audio signal; and
a shield integral with the moulded interconnect device (MID) housing, the shield configured to at least partly prevent an electronic component accommodated in the moulded interconnect device (MID) housing from disturbing an operation of the telecoil.

27. A hearing aid comprising:
a radio; and
a moulded interconnect device (MID) housing, wherein the MID housing is a hearing aid housing, the MID housing comprising a battery compartment configured to accommodate a battery that provides power for the hearing aid;
wherein the moulded interconnect device (MID) housing comprising the battery compartment also comprises an antenna integrated with the moulded interconnect device (MID) housing such that the antenna is an integral part of the moulded interconnect device (MID) housing;
wherein the antenna is operatively connected with the radio for wireless communication.

28. The hearing aid according to claim 27, wherein the antenna is integrally formed on an exterior surface of the moulded interconnect device (MID) housing.

* * * * *